United States Patent [19]

Inubushi et al.

[11] Patent Number: 5,086,509
[45] Date of Patent: Feb. 4, 1992

[54] THERMALLY ADAPTIVE HOUSING FOR HAND HELD RADIO TELEPHONE DEVICE

[75] Inventors: Toshiya Inubushi; Atsushi Musha; Manabu Hasegawa, all of Hyogo, Japan

[73] Assignee: Mitsubishi Denki Kabushiki Kaisha, Tokyo, Japan

[21] Appl. No.: 459,290

[22] Filed: Dec. 29, 1989

[30] Foreign Application Priority Data

Apr. 3, 1989 [JP] Japan ............................ 1-84384

[51] Int. Cl.⁵ .......................... H04B 1/38; H05K 7/20
[52] U.S. Cl. ................................. 455/89; 455/90; 361/383; 361/386; 361/389
[58] Field of Search ..................... 455/89–90, 455/128, 217, 347–349, 350, 351; 379/437, 440; 361/386, 388, 389, 383, 392, 394, 395, 399, 422; D7/354, 360, 361, 393, 395; 30/125

[56] References Cited

U.S. PATENT DOCUMENTS

| | | | |
|---|---|---|---|
| 3,091,736 | 5/1963 | Germain | 455/90 |
| 3,348,148 | 10/1697 | Parens et al. | 455/90 |
| 3,556,904 | 12/1967 | Yonkers | 361/389 |
| 3,676,745 | 7/1972 | Traweek | 361/388 |
| 3,684,925 | 8/1972 | Naff, Jr. | 361/388 |
| 4,257,121 | 3/1981 | Henderson et al. | 455/89 |
| 4,717,989 | 1/1988 | De Barros et al. | 361/388 |

FOREIGN PATENT DOCUMENTS

81/00654  3/1981  European Pat. Off. .
2043396  10/1980  United Kingdom .

*Primary Examiner*—Curtis Kuntz
*Assistant Examiner*—Andrew Faile
*Attorney, Agent, or Firm*—Rothwell, Figg, Ernst & Kurz

[57] ABSTRACT

A housing for a portable radio telephone device to which a part thereof is exposed externally at a position recessed from an outer surface of a portable radio telephone device so that the part does not contact the skin whereby heat generated within the portable radio telephone device is efficiently radiated outside and a reliable operability is provided without the outersurface portions to thereof become too hot or cold to comfortably hold by hand.

15 Claims, 10 Drawing Sheets

THERMALLY ADAPTIVE HOUSING FOR HAND HELD RADIO TELEPHONE DEVICE

BACKGROUND OF THE INVENTION

1. Field of the Invention

This invention relates to a housing construction for a portable type radio telephone device.

2. Description of the Prior Art

Figure 1:
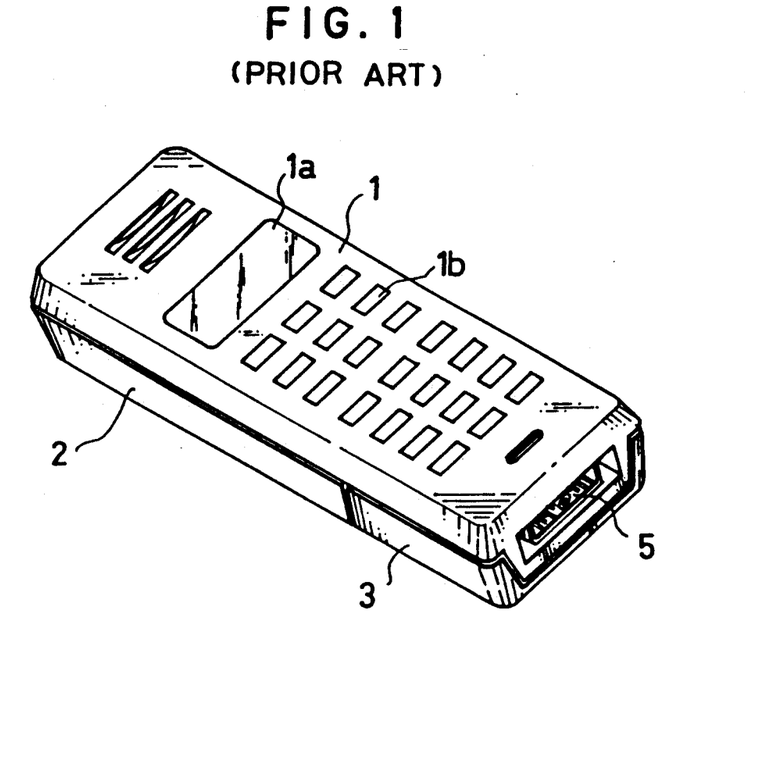
FIG. 1 is an external perspective view showing a housing construction of a conventional portable telephone radio device.
Figure 2:
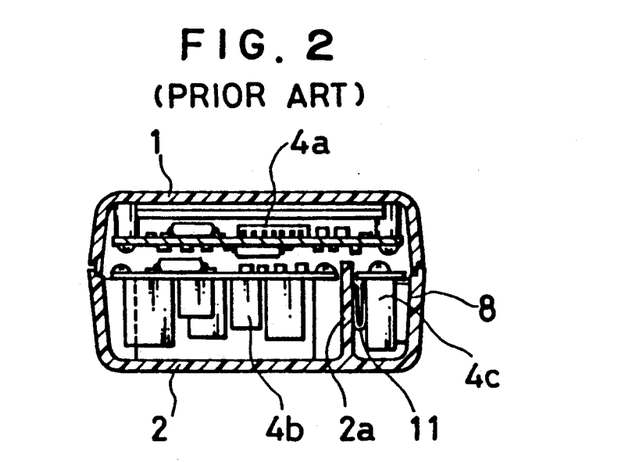
FIG. 2 is a transverse sectional view of the embodiment of FIG. 1.

FIG. 1 is an external perspective view showing a conventional housing construction for a portable type radio telephone device. FIG. 2 is a cross-sectional view of the same, in which reference numeral 1 designates an upper cover usually made of plastic, on which a display portion 1a and an operating button portion 1b and the like are disposed.

Reference numeral 2 designates a lower cover within which a main unit of a radio telephone device is fixedly mounted. This lower cover 2 is made, for example, by aluminum die casting, has a good thermal conductivity, is adapted to be combined with the upper cover 1, and has a partitioning wall 2a integrally formed therein.

Reference numeral 3 designates a battery pack which serves as a power source for the portable radio telephone device. The battery pack 3 forms a part of the lower cover 2 and is detachably mounted on the back of the portable radio telephone device, i.e., the lower portion of the upper cover 1. Reference numeral 4a designates an internal unit for controlling various functions required for enabling operation of a portable radio telephone device. Internal unit 4b has a synthesizer portion and a receiver portion which form essential components enabling operation of the portable radio telephone device. Internal unit 4c transmitter output portion which generates the largest amount of heat in the portable radio telephone device. Also, external connector 5 is for supplying power from an external power source to the device and can be connected to other optional instruments.

Reference numeral 8 designates a radiant contact surface for conducting the heat of the internal unit to the lower cover 2, and 11 designates a rebound leaf for urging the internal unit 4c against the lower cover 2 to obtain a close contact with the radiant contact surface 8.

The operation of the device will be described hereinafter. When the portable radio telephone device is being used, the internal units 4a and 4c generate heat to some extent, and the heat is radiated from the outer surface of the portable radio telephone device by conduction, convection and radiation.

In the case where the portable radio telephone device is used in the transmitting state, the internal unit 4c as a transmitter output portion generates a relatively large quantity of heat. Because of this, the heat generating portion of the internal unit 4c is mounted in such way that it is directly in close contact with the inner surface of the lower cover 2. This contact is secured by the rebound leaf 11, and the heat from the internal unit 4c is effectively conducted to the lower cover 2 which has a large heat capacity, so that the device is maintained within an acceptable temperature rise.

Since the conventional portable radio telephone device is constructed as described above, the heat from the internal unit 4c, having a large heat generating quantity, is efficiently conducted to the lower cover 2 made of a metal having a good thermal conductivity which forms the outer surface of the portable radio telephone device. Consequently, the temperature of the outer surface of the portable radio telephone device becomes increasingly higher as it is being used.

Therefore, in the case that the portable radio telephone device is used for a long period of time, the temperature of the outer surface of the portable radio telephone device sometimes becomes too high to be comfortably held by hand. As a protective measure, a circuit for restricting the use of the portable telephone radio device is required to prevent the device from being used for a period in excess of a given time. This causes a problem in that the device cannot be continuously used.

Furthermore, another problem arises in that when the portable radio telephone device is first held by hand from its holding state when a temperature is extremely low, in a winter season or the like, the device is too cold to be comfortably held by hand.

Alternatively, the outer surface of a portable radio telephone device may be formed from a resin-made cover having a thermal insulating effect in order to keep the external temperature low enough to be comfortably held by hand. This also poses a problem in that the temperature rise within the portable radio telephone device increases because of the heat insulating effect, and the reliability of the portable radio telephone device potentially could be impaired.

SUMMARY OF THE INVENTION

This invention overcomes the problems as noted above. It is an object of this invention to provide a portable radio telephone device which can radiate the heat generated within the portable radio telephone device efficiently to the outside. This will enable the device to be comfortably operated by hand without causing the device's outer surface to be too hot or cold and to have a high operational reliability.

In a portable radio telephone device according to one embodiment of this invention, an upper cover and a lower cover forming the outer surface of a portable radio telephone device are made of plastic having a thermal insulating effect, and a part of an internal metal chassis having a good thermal conductivity is exposed externally at a position recessed from the outer surface of the portable radio telephone device.

Other objects and advantages of the invention will be more apparent from the following detailed description taken in connection with the accompanying drawings.

PREFERRED EMBODIMENTS OF THE INVENTION

One embodiment of this invention will be described hereinafter with reference to the drawings. In FIGS. 3 to 6, reference numeral 1 designates an upper cover preferably made of plastic or a similar thermally insulating material, on which a display portion 1a and an operating button portion 1b and the like are disposed. Reference numeral 2 designates a lower cover also preferably made of plastic, and 3 is a battery pack serving as a power source for a portable radio telephone device. The battery pack forms a part of the lower cover 2 and is detachably mounted on the back of the device, that is, on the lower portion of the upper cover 1.

Reference numeral 4a designates an internal unit for controlling various functions required for the operation of a portable radio telephone device. Internal unit 4b has a synthesizer portion and a receiver portion which form essential operational portions of the portable radio telephone device. Internal unit 4c has a transmitter output portion which generates the largest quantity of heat within the portable radio telephone device. External connector 5 is for supplying power from an external power source to the portable radio telephone device, and can be connected to other optional instruments.

Figures 3, 4, 5:
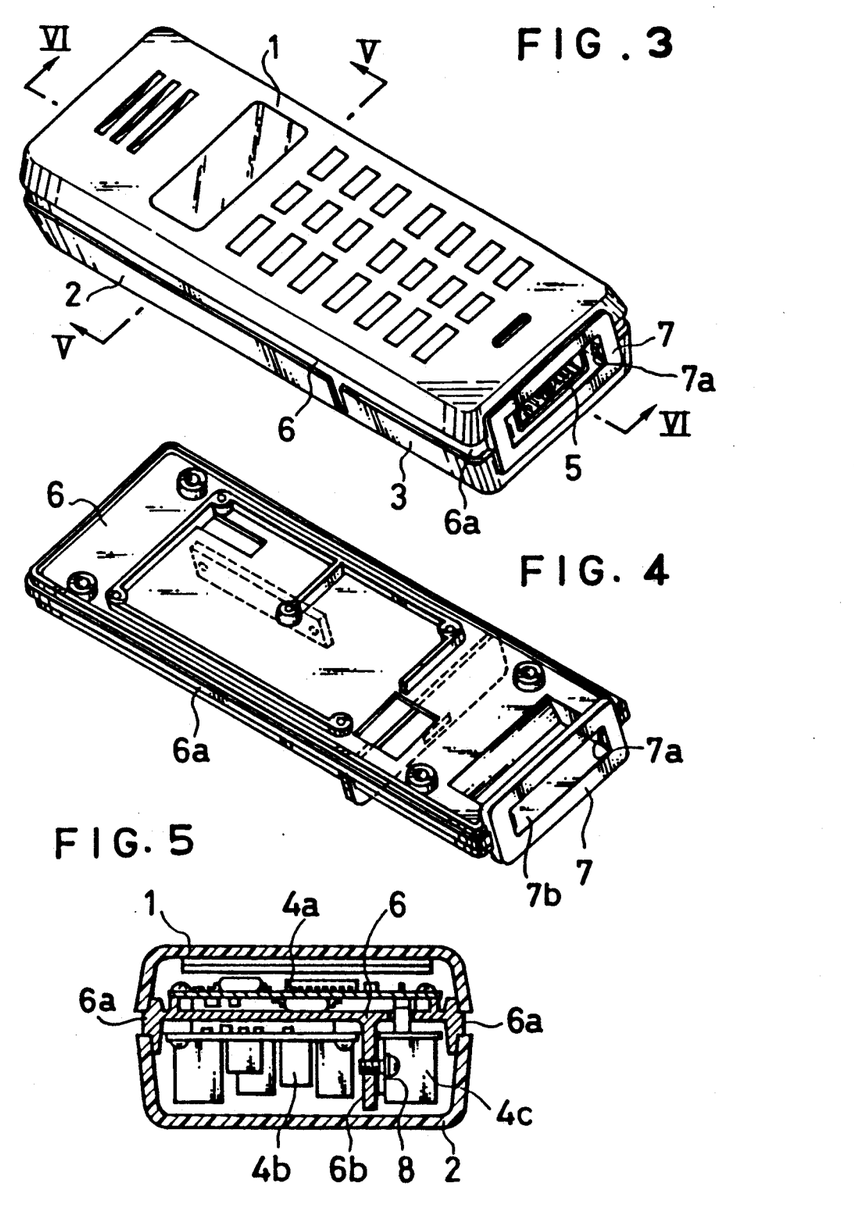
FIG. 3 is an external perspective view showing a housing construction of a portable radio telephone device according to one embodiment of this invention.
FIG. 4 is a perspective view of the metal chassis of the embodiment of FIG. 3.
FIG. 5 is a transverse sectional view taken along line V—V of FIG. 3.
Figure 6:
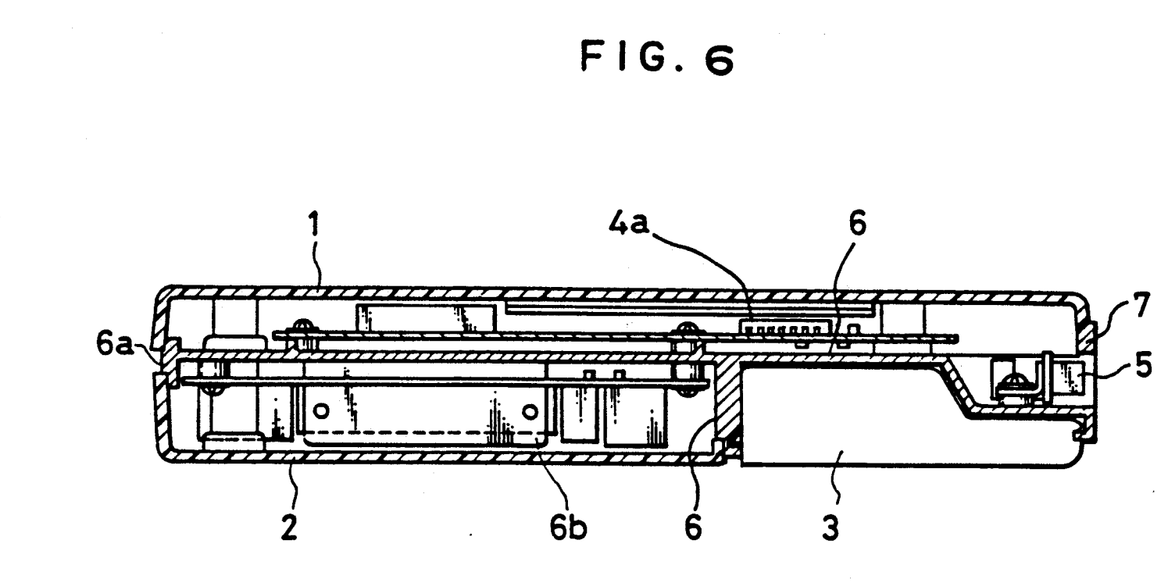
FIG. 6 is a longitudinal sectional view taken along line VI—VI of FIG. 3.

Reference numeral 6 designates a metal chassis formed, for example, by aluminum die casting, having a good thermal conductivity, and is combined with the upper cover and the lower cover 2 in a sandwiched manner. The internal unit 4a, internal unit 4b, and internal unit 4c are fixedly mounted to the metal chassis 6. Metal chassis 6a is an exposed portion which is a part of the metal chassis 6 exposed at a position recessed from the outer surface of the portable radio telephone device as illustrated in FIGS. 3, 5 and 6. Recessed portion 6a effectively radiates the devices internal heat and is prevented from being in contact with the users skin. Radiant conductive member 6b is projected from a part of the metal chassis 6 within the portable radio telephone device.

Reference numeral 7 designates a frame-like metal exposed surface which is a part of the metal chassis 6 exposed to the bottom surface of the portable radio telephone device at a position slightly projected from the device's outer surface. Metal surface 7 is provided in the center of the frame with an aperture 7b for accommodating a connection to the exterior. Pawl-like convex portions 7a are provided in opposed relation at two locations in the inner surfaces of the aperture 7b for accommodating the connector disposed in the center of the frame-like exposed surfaced 7. Radiant contact surface 8 is for conducting the heat of the internal unit 4c to the metal chassis 6 via radiant conductive member 6b.

Figure 7:
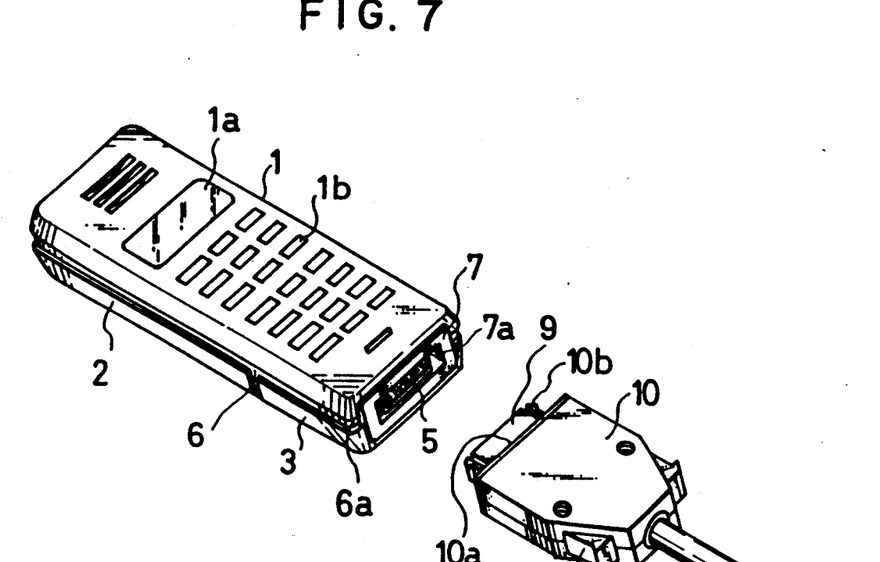
FIG. 7 is an external perspective view showing a connection between a portable radio telephone device and an external connector.
Figure 12:
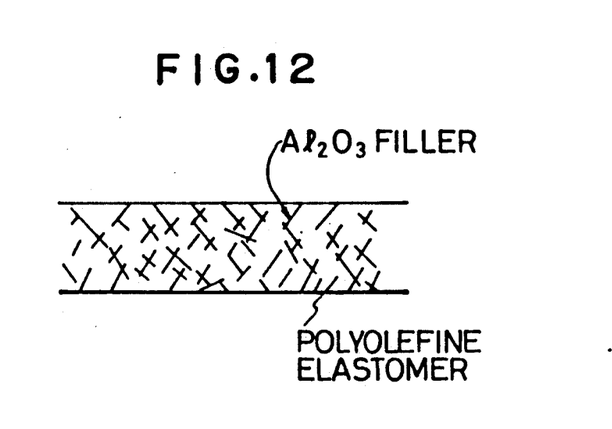
FIG. 12 is a section view of the heat conductive rubber used in the present invention.
Figure 13:
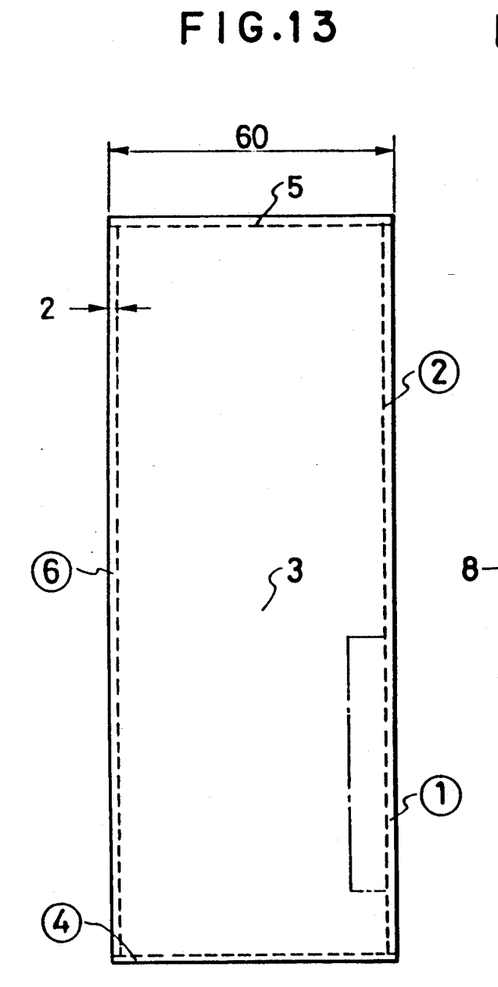
FIGS. 13-15 illustrate nodes representing areas of interest for thermal analysis from the front, side and end views respectively of the conventional portable radio telephone device.
Figure 14:
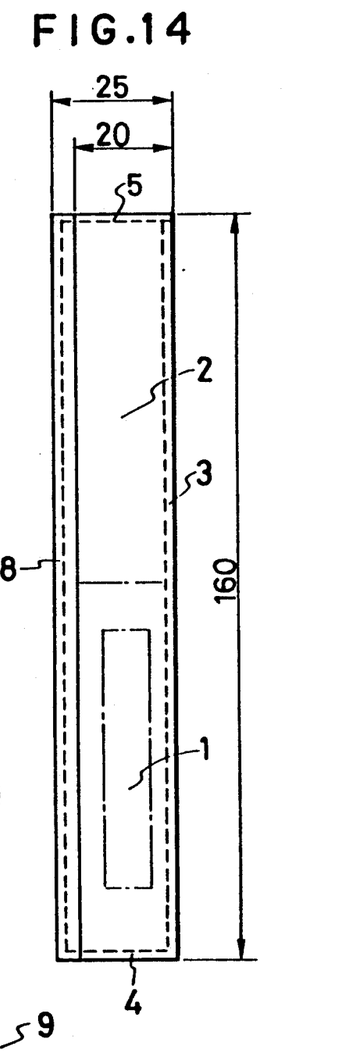
Figure 15:
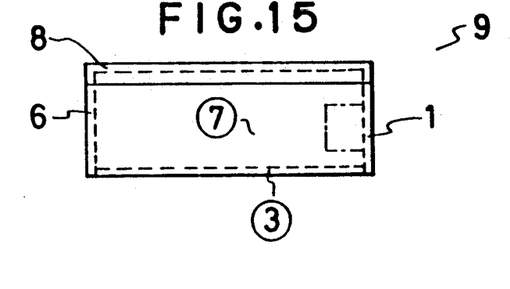
Figure 16:
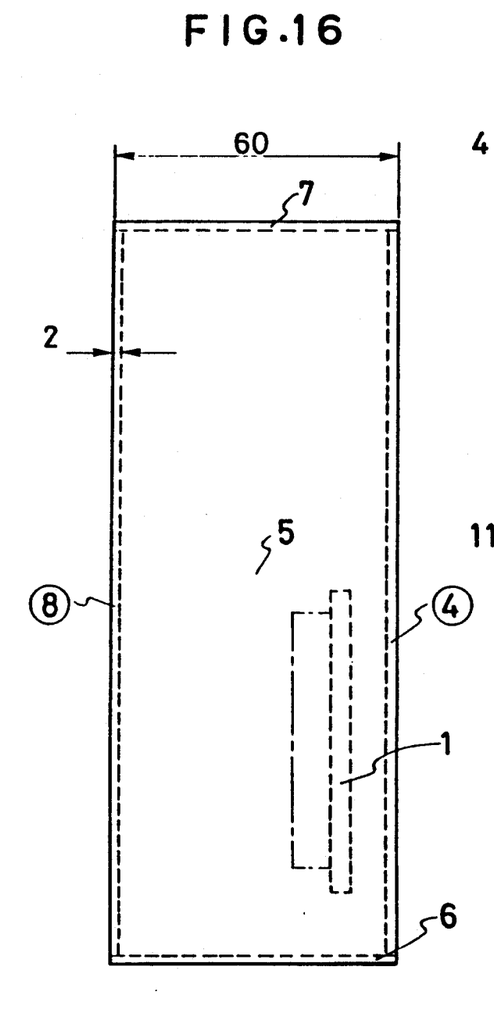
FIGS. 16-18 illustrate nodes representing areas of interest for thermal analysis from the front, side and end views respectively of the portable radio telephone device of the present invention.
Figure 17:
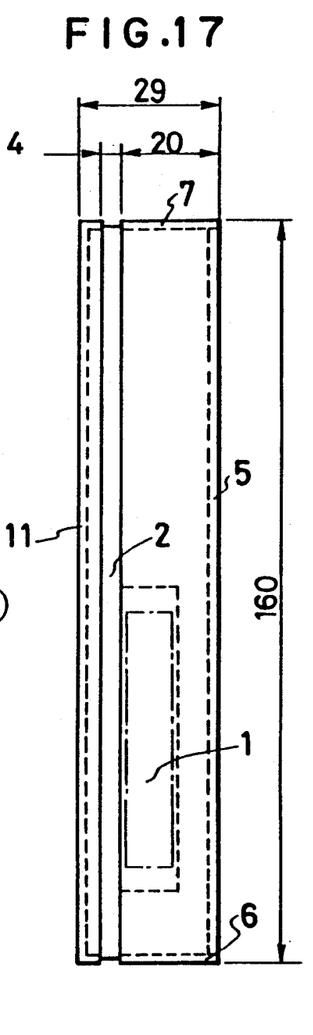
Figure 18:
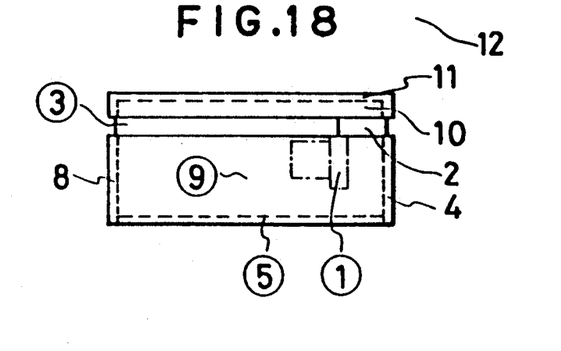

FIG. 7 is a perspective view showing an external connector 9 positioned to be fitted into the connector 5. This external connector 9 is fitted into the external connector 5 to render a supply of external power to the portable radio telephone device and a connection with other optional instruments. Also, the connector space defined by aperture 7b is wider to radiate more heat and to conduct heat externally. Reference numeral 10 designates a connector cover made of metal having a good heat conductivity for mounting and holding the external connector 9. Reference numeral 10a designates a heat conductive rubber sheet laid in the head of the connector cover so as to come into surface contact with the frame-like metal exposed surface 7 provided on the bottom surface of a portable radio telephone device when the external connector 5 is connected to and fitted into the external connector. The heat conductive rubber sheet is rendered heat conductive by having particulate conductive material such as $Al_2O_3$ laced through the rubber material as illustrated in FIG. 12. This heat conductive rubber sheet is manufactured by the Mitsubishi Corp. as Mitsubishi TF Rubber (No. K-C 4007-A SA 8301 (RJ1)). Futhermore, any suitable heat conductive rubber sheet can be used as well.

As shown in FIG. 3, locking member 10b engages with said pawl-like convex portions 7a to hold the external connector 5 and the external connector 9 in the fitted relation and to hold in physical contact the frame-like metal exposed surface 7 and the connector cover contact surface 10a. Release button 10c is for releasing the locked state between the pawl-like convex portions 7a and the locking member 10b.

The function of the device will be described hereinafter. The heat generating portion of the internal unit 4c is mounted in good heat conductive contact with the radiant contact surface 8, as shown in FIG. 5, on the radiant conductive member 6b provided on a part of the metal chassis 6. Heat generated in the internal unit 4c is thus efficiently conducted to the metal chassis 6 which has a good conductivity and a large thermal capacity.

Heat from the internal unit 4a and internal unit 4b is also transferred to the metal chassis 6 by conduction, convection and radiation through the available heat transfer routes. The metal chassis thus efficiently absorbs heat generated within the portable radio telephone device to equalize the balance of heat within the device and to conduct the heat externally.

A peripheral portion 6a forming a part of the metal chassis 6 is exposed to the outer surface of the portable radio telephone device, whereby the heat absorbed by the metal chassis 6 is conducted efficiently to the outer surface of the portable radio telephone device for radiation.

In operation the exposed surface 6a of the metal chassis 6 becomes so hot that it cannot be comfortably touched. However, the exposed surface 6a is provided at a recessed position below the outer surface of the portable radio device, and therefore, even if the portable radio device is gripped by hand, the surface 6a will not directly touch the hand. Moreover, the portion being gripped is made of a plastic polycarbonate resin which is a heat insulating material, and therefore, is comfortable to the touch during operation.

To better illustrate the advantages of constructing a housing for a portable radio telephone device wherein the upper and lower covers are made of a heat insulating resin material in accordance with the present invention, a thermal analysis was conducted on the housing of the instant invention and on the conventional housing utilizing the thermal network method. The thermal network method is characterized in that portions of each housing are blocked into several areas having respective nodes at points representing points of interest on the basis of thermal theory as shown in FIGS. 13-18.

The materials from which the housing portions are constructed and the respective constants are assumed as follows:

|  | MATERIAL | THERMAL CONDUCTIVITY [w/mk] | SPECIFIC WEIGHT [kg/m$^3$] | SPECIFIC HEAT [kcal/kg °C.] |
|---|---|---|---|---|
| METAL | ALUMINUM | 203.5 | 2700 | 0.215 |
| SYNTHETIC RESIN | POLYCARBONATE | 0.198 | 1200 | 0.3 | a caloric value of a heating member: 2[W]
an outside air temperature: 20[°C.]

As stated above, the nodes representing areas of interest on the respective housings are illustrated by the circled numbers in FIGS. 13-18.

Figure 19A:
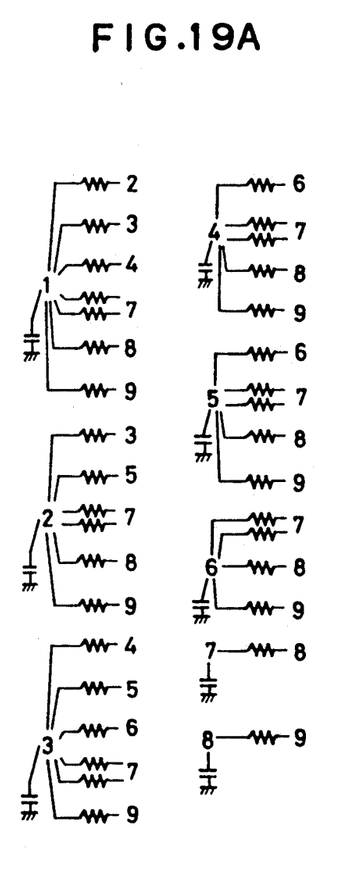
FIGS. 19A and 19B illustrate a thermal resistance network bridging the nodes in the conventional housing and the housing of the present invention respectively.
Figure 19B:
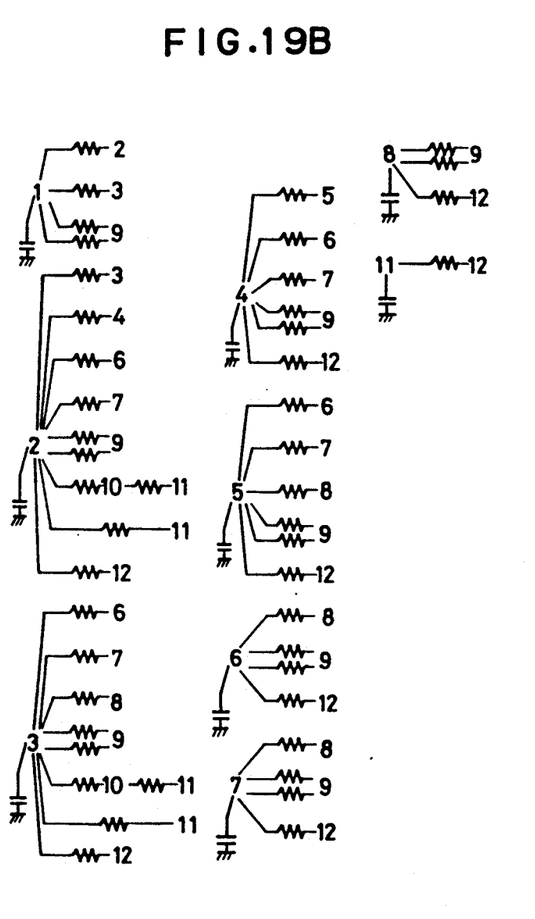
Figure 20:
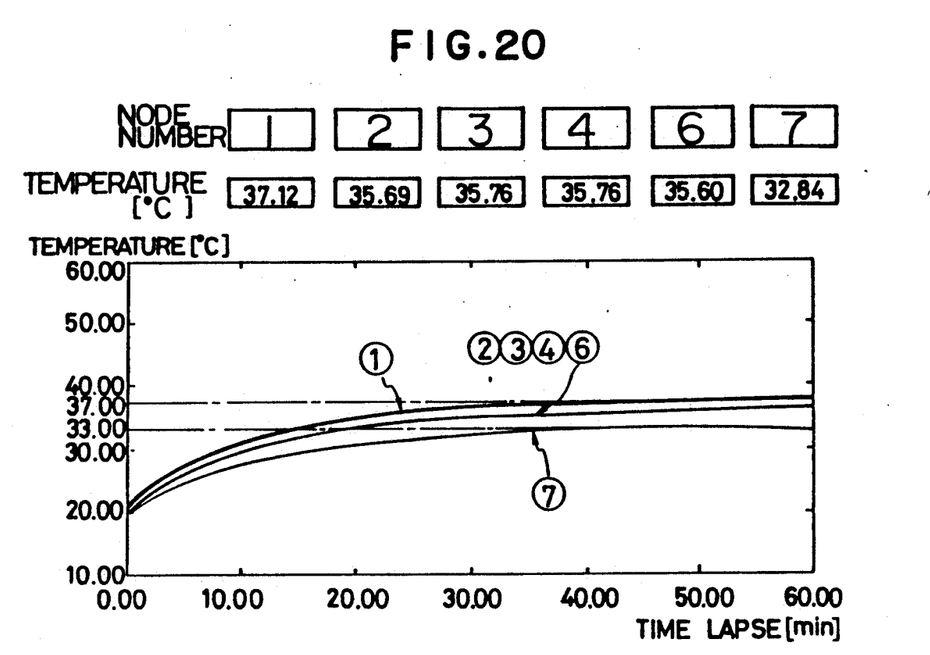
FIGS. 20 and 21 illustrate the temperature characteristics at the nodes in the conventional housing and housing of the present invention respectively.
Figure 21:
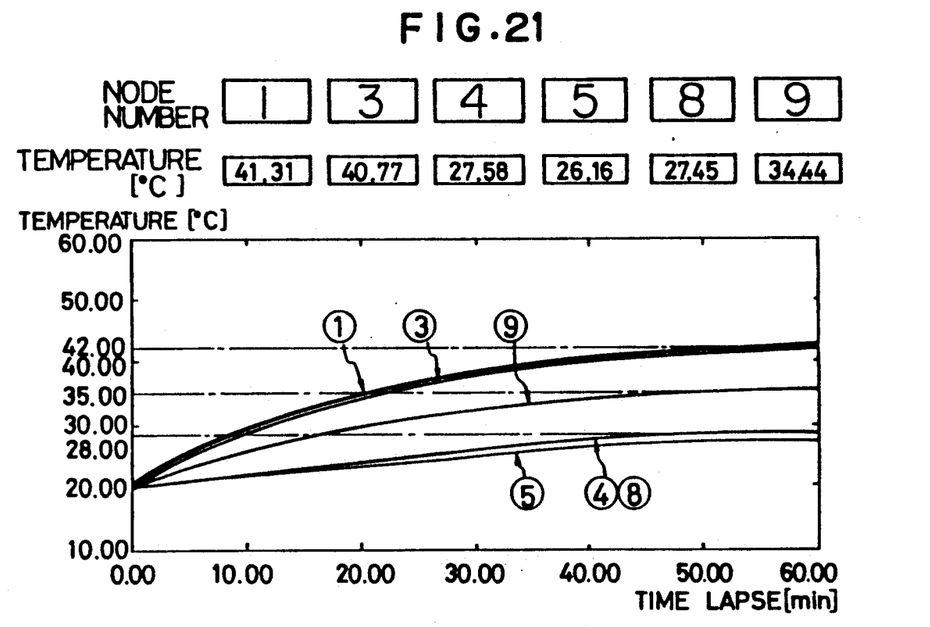

By bridging the nodes with thermal resistance based on the above conditions as shown in FIG. 19 and by solving heat balance equations established among the nodes, a temperature rise value at each node of the conventional and new housings is obtained as shown in FIGS. 20 and 21 respectively.

As shown in FIG. 20, surface temperature of the conventional housing at the nodes 1, 2, 3 and 6, after the radio telephone device has been operated for an hour, read 17° C. higher than the outside air temperature. FIG. 21 illustrates that the surface temperatures of the new housing at nodes 4, 5, and 8, after the radio telephone device has been operated for an hour, reads only 8° C. higher than the outside air temperature, although temperatures of the inner metal chassis at nodes 1 and 3 read 22° higher than the outside air temperature. Furthermore, temperatures of inner spaces of the conventional housing at node 7 and of the new housing at the node 9, read 13° C. and 15° C. higher than the outside air temperature as illustrated in FIGS. 20 and 21 respectively.

It is clearly seen from the above derived results that the radio telephone housing constructed in accordance with the present invention has several advantages over the conventional housing. For example, if the outside temperature becomes 35° C. or higher, it is difficult to comfortably hold the conventional housing by hand because the surface temperature thereof rises to 52° C. or higher. On the other hand, the surface temperature of the new housing rises up at most 43° C. under the same conditions. Furthermore, the temperatures rise rates with respect to the time lapse are smaller than that of the conventional housing.

Although the temperatures of the inner spaces of the new housing are about 3° C. higher that of the conventional housing, the temperature rise rates of the inner spaces of the new housing with respect to the time lapse are smaller than that of the prior housing.

As this thermal analysis indicates, the invention can provide a housing for a portable radio device whose structure assures effective dissipation of heat generated inside the housing, so that it is never uncomfortably hot handle and which enables reliable operation.

The portable radio telephone device cannot, of course, be used for a long period of time when the supply of power is from the battery pack 3, which has a limited capacity. Therefore, for extended operation, the external connector 5 is provided on the bottom of the portable radio device so that an external power supply can be used.

For such operation, the frame-like metal exposed surface 7 is in surface contact with the head of the metal connector cover 10 through the heat conductive rubber sheet 10a, and thus the heat generated within the portable radio telephone device absorbed by the metal chassis 6 is also radiated through the metal connector cover 10.

This means that while the portable radio telephone device is being operated only by the battery pack, use time is limited and the present invention's advantageous structure prevents an unacceptable rise in temperature within the limit. Moreover, in the case of an external power supply provided by the external connector 9, the operational time limit is removed. Because of this, when the external connector 9 is connected, the metal chassis 6 and the metal connector cover 10 are thermally connected, and a metal radiant area having a large heat capacity is further available to suppress a rise in internal temperature.

Figure 8:
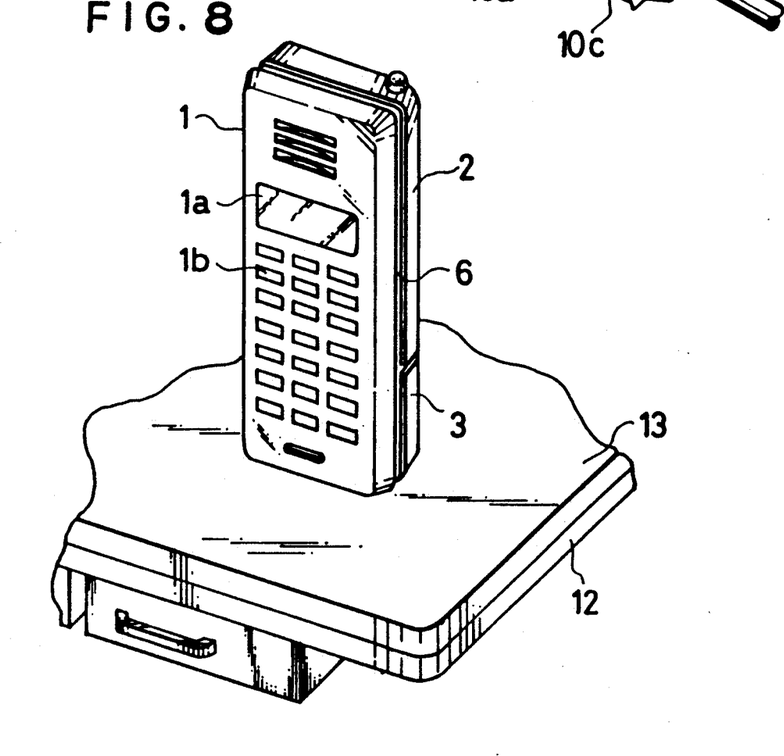
FIG. 8 is an external perspective view showing a case where a portable radio telephone device is stood upright on a desk.

After the use of the portable telephone device has been suspended, it is desirable to lower the elevated internal temperature as quickly as possible. As shown in FIG. 8, the portable radio telephone device is stood upright so that the frame-like metal exposed surface 7 may come into contact with the upper surface 13 of the desk 12, whereby heat within the device is more promptly radiated. Furthermore, the device could be stood upright on many flat heat conductive surfaces to more promptly radiate the internal heat.

Figure 9:
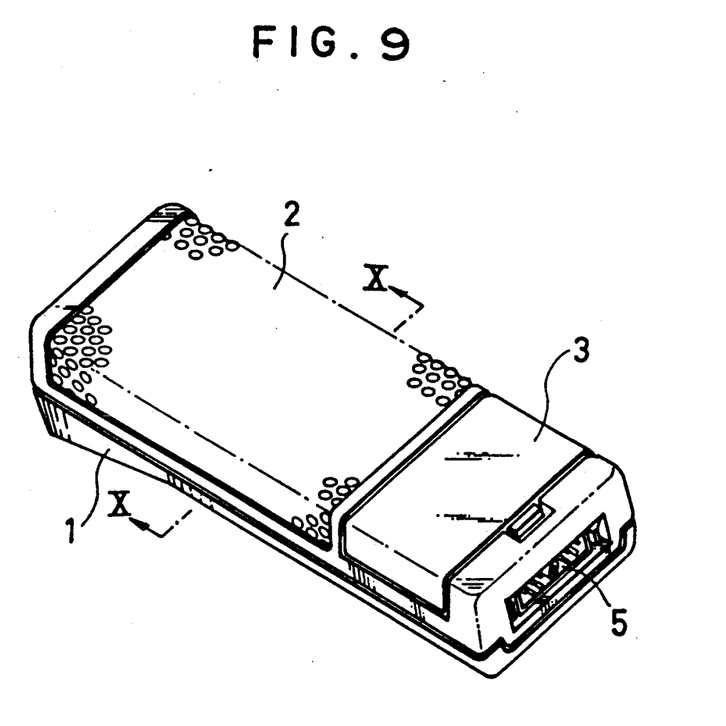
FIG. 9 is an external perspective view showing an alternate embodiment of this invention.
Figure 10:
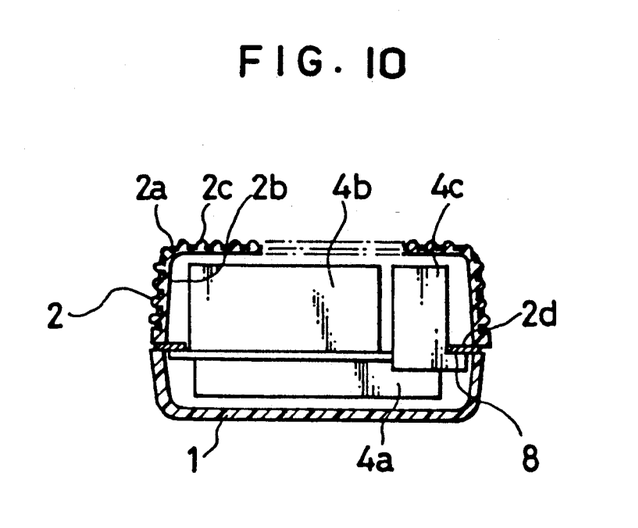
FIG. 10 is a transverse sectional view taken along line X—X of FIG. 9.

FIG. 9 is an external perspective view showing another embodiment according to the present invention, and FIG. 10 is a transverse sectional view taken along line X—X of FIG. 9. While in the above-described embodiment, a part of the internal metal chassis 6 is exposed to the outer surface of the portable radio telephone device, it is to be noted that as shown in FIGS. 9 and 10, a part of the resin cover of the portable radio telephone device is compounded with a metal having a good thermal conductivity.

FIGS. 9 and 10 illustrate and upper cover 2 of the radio telephone device which is a composite body having a synthetic resin layer and a metal plate cover formed such that the users hand does not come into contact with the metal cover. In FIG. 10, reference numeral 2a denotes a metal plate cover into which a metal plate having a good thermal conductivity, e.g. aluminum, having numerous holes is formed. Cover plastic layer 2b is formed to have a generally even thickness on the inner surface of the metal plate cover 2a. Resins for forming the cover resin layer 2b used included for example, ABS resin and polycarbonate resin. Numeral 2c denotes a projection which is a part of the cover resin layer 2b projected out from the numerous holes formed in the metal plate cover 2a. The height of the projection 2c is set so as not to be too small as compared with a hole pitch provided on the metal plate cover 2a.

Figure 11:
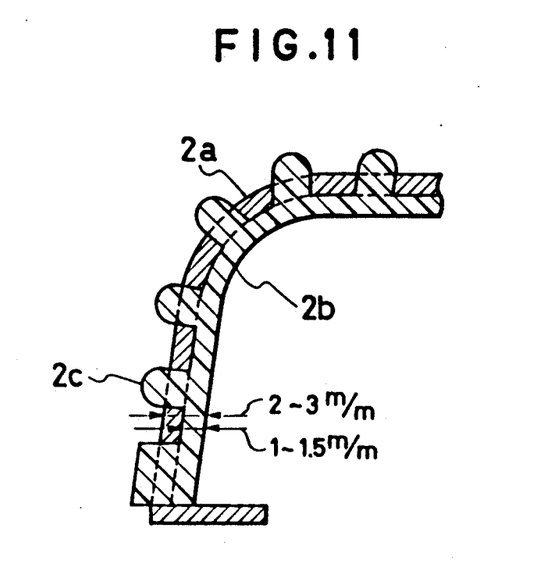
FIG. 11 is a sectional view showing the upper cover and metal plate of the alternate embodiment shown in FIG. 9.

FIG. 11 shows an enlarged view of the housing cover shown in FIG. 10 wherein the resin material forming inner surface 2b has projections 2c protruding through the numerous holes in metal plate cover 2a. As illustrated in a preferred embodiment, the resin layer 2b thickness can be approximately 1.0-1.5 mm and the resin layer and metal plate thickness can be approximately 2 to 3 mm. These dimensions are for illustrative purposes only and can be chosen to be any value such that the hand is prevented from contacting the metal plate.

A part 2d of the peripheral end of the metal plate cover 2a is bent into the interior of the portable radio device so that the portion comes into contact with metal chassis 6. Portion 2d thus absorbs the heat generated in internal units and efficiently radiates the heat from the outer surface of the portable radio telephone device.

In normal operation, the metal plate cover 2a becomes so hot that it cannot be comfortably touched. However, the numerous projections 2c projected from the metal plate cover 2a, and a dimensional relationship between the height and pitch of the projections 2c, is set in such way that the hand will not directly touch the metal plate cover 2a. Moreover, since the portion being gripped is made of a polycarbonate resin which is a heat insulating material, the radio telephone device can be used without any operational trouble.

Further, while in the above-described embodiment, thermoplastic resins capable of injection molding (for example, such as ABS resin, polycarbonate resin, etc.) are used as materials for the cover resin layer and the projections, elastomer resin or EPDM having a flexibility may be used as well. In this case, the numerous projections 2c projecting from the cover of the portable radio telephone device are made of rubber, and therefore an anti-skid effect is obtained when the portable radio device is held.

As described above, according to the present invention, the metal chassis having a good thermal conductivity is used as an internal frame, and a part of the metal chassis is exposed to the outside at a position depressed from the outer surface of the portable radio telephone device. As a result, the heat generated within the device is efficiently absorbed by the metal chassis and is conducted toward the outer surface of the device to be radiated.

Moreover, a housing for a portable radio telephone device which can be comfortably held by the hand and has an excellent reliability is constructed wherein the radiant surface thereof is prevented from directly contacting the users hand and whereby the portion gripped by the hand is formed from a heat insulating plastic.

We claim:
1. A housing for a portable hand held radio telephone device comprising an upper cover and a lower cover having outer surfaces, said upper cover and said lower cover being made of heat insulating material; and a metal chassis having a good thermal conductivity held between said upper cover and said lower cover, said chassis having a surface part thereof exposed to the outer surface of said device, said exposed surface part being recessed inwardly from the outer surfaces of said upper cover and said lower cover such that direct contact between the hand by which said device is held and said surface part is prevented when the device is held by hand.

2. The housing according to claim 1, wherein said metal chassis has an exposed portion slightly projected from the bottom surface of the housing.

3. The housing according to claim 1, wherein the exposed portion of said metal chassis is formed in the shape of a frame having an inner surface, and a connector means for connecting an external power source is provided in the center of said frame.

4. The housing according to claim 3, wherein a convex portion positioned to engage and hold an external connector is provided on the inner surface of the exposed portion of said frame of said metal chassis.

5. The housing according to claim 4, wherein a metal connector cover of the external connector which is engaged and held by said convex portion and connected to said connector is brought into surface contact with said exposed portion of said frame enabling heat to be dissipated therethrough.

6. The housing according to claim 5, wherein said metal connector cover is provided in contact with said exposed portion of said frame with a heat conductive rubber sheet positioned therebetween.

7. The housing according to claim 4, wherein the exposed portion of said frame of said metal chassis is adapted to be placed in surface contact with a flat surface when the external connector is removed.

8. The housing according to claim 1, wherein said metal chassis is made by aluminum die casting.

9. The housing according to claim 1, wherein a battery pack is mounted as part of said lower cover.

10. The housing according to claim 1, wherein said lower cover and said upper cover are made of a polycarbonate resin.

11. A housing for a portable hand held radio telephone device comprising an upper cover and a lower cover having outer surfaces, at least one of which is formed of a composite body of a synthetic resin and a metal plate cover; and a metal chassis having good thermal conductivity positioned between said upper cover and said lower cover, said chassis having a surface part thereof exposed to the outer surface of said device, said exposed surface part being recessed inwardly from the outer surfaces of said upper cover and said lower cover such that direct contact between the hand by which said device is held and said surface part is prevented when the device is held by hand.

12. The housing according to claim 11, wherein said composite body is designed so that a synthetic resin layer is formed on an inner surface of said metal plate cover which has numerous holes therein, said synthetic resin layer being projected outside through said holes to form projections.

13. The housing according to claim 12, wherein a dimensional relationship between the height and pitch of the projections of the synthetic resin layer are set such that a hand by which said device is held will not directly make contact with the metal plate cover.

14. The housing according to claim 12, wherein said synthetic resin material comprises a thermoplastic resin.

15. The housing according to claim 11, wherein said synthetic resin material comprises a flexible elastomer resin or a rubber material.

* * * * *